April 14, 1953     P. L. GERTZ     2,634,545
LIQUID ACTUATED FIGURE
Filed March 30, 1951
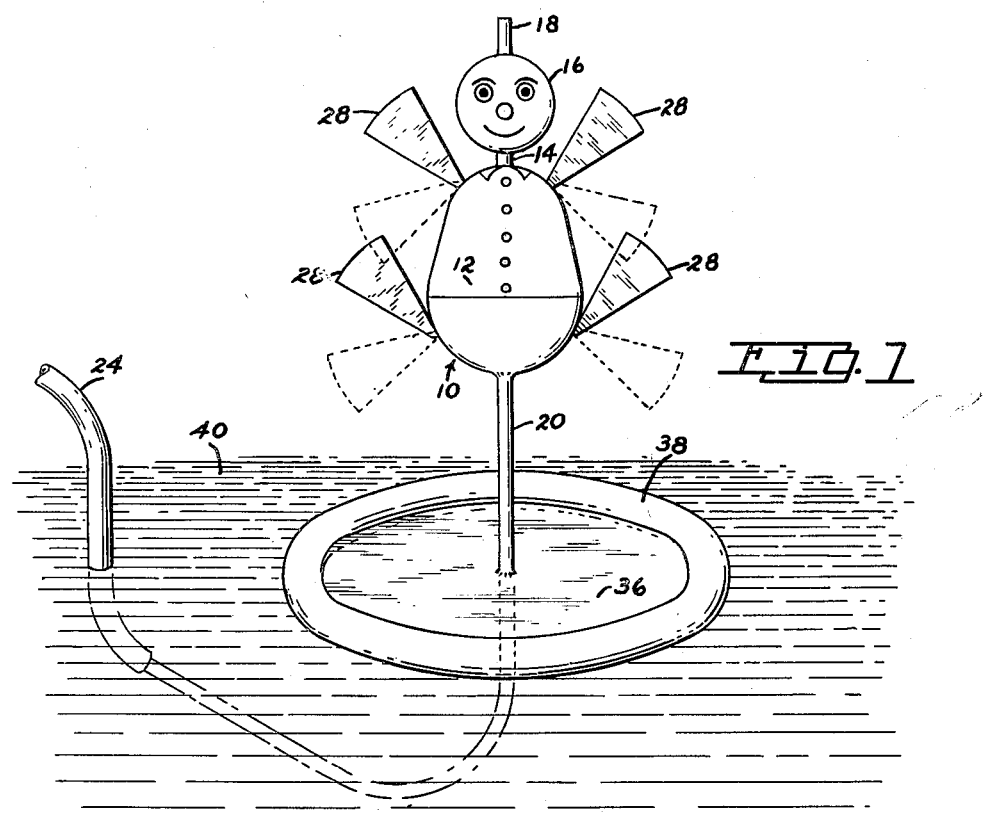
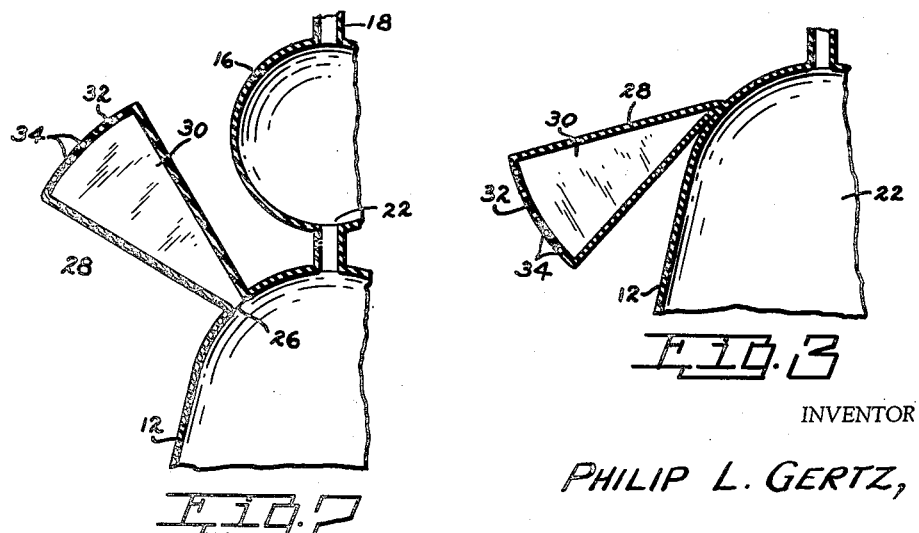
INVENTOR
PHILIP L. GERTZ,
BY
ATTORNEY Patented Apr. 14, 1953

2,634,545

UNITED STATES PATENT OFFICE 2,634,545

LIQUID ACTUATED FIGURE

Philip L. Gertz, Brooklyn, N. Y.

Application March 30, 1951, Serial No. 218,435

5 Claims. (Cl. 46—41)

The present invention relates to a liquid actuated figure and more particularly to a figure which is actuated by a continuous flow of water or the like.

The object of the present invention is to afford amusement and entertainment particularly for children.

The above and other objects may be attained by employing this invention which embodies among its features a body having a vertical passage extending therethrough and carrying laterally extending arms which move in vertically disposed arcuate paths, each such arm having a chamber therein which increases in size as it recedes from the body and which communicates with the passage through a port in the body which port is open when its respective arm is in its upward position but closes when the arm moves down so as to preclude the entrance of liquid into the chamber while the arm remains in its lowered position.

Other features of the present invention include a row of spaced liquid discharge openings in the end of each arm remote from the body which openings communicate with the chamber in its respective arm so that when the arm is lowered, the liquid contained in the chamber thereof will be discharged therefrom in the form of jets which simulate the fingers of a hand.

In the drawing:

Figure 1 is a perspective view of one embodiment of this invention.

Figure 2 is an enlarged fragmentary sectional view of the body and head of the figure showing the normal upward position of an arm, and Figure 3 is a view similar to Figure 2 showing the arm lowered under the weight of liquid contained therein.

Referring to the drawing in detail the figure designated generally 10 represents a grotesque human body comprising a hollow body portion 12 carrying at its upper end a tubular extension 14 representing a neck surmounted by a hollow bulbous portion 16 representing the head. A tubular overflow nipple 18 extends upwardly from the head to take care of any over filling of the device with liquid. A tubular stem 20 projects downwardly from the body portion 12 and the whole structure thus far described intercommunicates to form a vertical passage 22 into the lower end of which liquid is fed in any suitable manner as by a flexible pipe 24 which may be connected to a suitable source of water pressure such as a faucet.

The entire figure 10 is preferably formed of a flexible resilient material, such as rubber, and the body 12 is provided on opposite sides with vertically spaced ports 26. An arm 28 is carried by the body adjacent each port 26 and each such arm is hollow to form a chamber 30 which increases in size as it recedes from the body. The chamber 30 of each arm 28 communicates, when the arm is in upward position with the passage 22 through the adjacent port 26, and when the arm is lowered as illustrated in Figure 3, the port 26 is closed so as to preclude the flow of liquid from the passage 22 into the chamber 30. Formed in the end 32 of each arm 28 remote from the body 12 is a row of spaced liquid discharge openings 34 through which liquid contained in the chamber 30 is discharged when the arm 28 is lowered as shown in Figure 3. In the preferred form of the invention there are five liquid discharge openings in each row of openings in each arm 28 so that the liquid discharged from a chamber 30 will flow outwardly in the form of five jets thus to simulate the fingers of a hand.

The device may be supported in any desired manner such as securing to the tubular stem 20 a base plate 36 of any suitable material which carries at its perimeter a float 38 by which the figure 10 may be supported in upright position on the surface of a pool or other body of water 40. Obviously other means of support or other types of body may be employed provided the passage 22 remains vertical.

In use the tubular stem 20 is coupled to any suitable source of liquid supply so that liquid will rise in the passage 22 past the ports 26. As the liquid rises above the ports 26 it enters the chambers 30 of the respective arms 28. Rising in the chambers 30, the weight of the liquid becomes great enough to cause arms 28 to drop against the effort of the resilient material from which the body 12 is made. By thus dropping through their respective vertical arcuate paths as suggested by the dotted lines in Figure 1, the ports 26 opening into their respective chambers will close as illustrated in Figure 3 so as to cut off further flow of liquid from the passage into the chambers 30. Simultaneously with the closing of a port 26 by the dropping of an arm 28 into the position shown in Figure 3, the liquid contained in the chamber 30 will flow through the discharge openings 34 in the form of five jets, thus simulating the five fingers of a hand. With the emptying of a chamber 30, its respective arm 28 will return to elevated position as shown in Figure 2, thus opening its respective port 26 and establishing communication between the passage and its respective chamber 30 for a repeat operation. The cycles of operation of the various arms 28 will be continuous so long as liquid is fed into the passage 22.

What is claimed is:

1. In a liquid actuated figure a body having a vertical passage extending therethrough, a laterally extending arm carried by the body for movement in a vertically disposed arcuate path, said arm normally extending upwardly and outwardly relative to the body and having a chamber therein which communicates with the passage and increases in size as it recedes from the body, said arm having a liquid discharge opening at its outer extremity whereby liquid filling the chamber will move the arm downwardly and the discharge opening into a position to empty the chamber the chamber being emptied, the arm will rise again to its normal position, and means to introduce liquid into the passage.

2. In a liquid actuated figure a body of flexible material having a vertical passage extending therethrough, a laterally extending arm of flexible material carried by the body for movement in a vertically disposed arcuate path from an upwardly and outwardly extending position to a downwardly and outwardly extending position, said arm normally extending upwardly and outwardly from the body and having a chamber therein which increases in size as it recedes from the body, said chamber communicating at its smaller end with the passage when the arm is in its upward position, said arm having a liquid discharge opening extending through the end thereof remote from the body and communicating with the chamber whereby liquid entering the chamber and moving the arm downwardly will be discharged through the discharge opening allowing the arm to return to its normal position and means to introduce liquid into the passage.

3. In a liquid actuated figure a body of flexible resilient material having a vertical passage extending therethrough and a laterally extending port extending therethrough and communicating with the passage, an arm carried by the body for movement in a vertically disposed arcuate path from a normal upwardly and outwardly extending position to a downwardly and outwardly extending position, said arm having a chamber therein which increases in size as it recedes from the body and which communicates at its smaller end with the port, and said arm having a liquid discharge opening at the end thereof remote from the body which discharge opening communicates with the chamber whereby liquid entering the chamber through the port while the arm is elevated will move said arm downwardly and move the discharge opening into liquid discharging position, the liquid being discharged, the arm will again rise to its normal position.

4. In a liquid actuated figure a body having a vertical passage extending therethrough, a laterally extending arm carried by the body for movement in a vertically disposed arcuate path, said arm normally extending upwardly and outwardly relative to the body and having a chamber therein which communicates with the passage and increases in size as it recedes from the body, said arm having a row of spaced liquid discharge openings at the end thereof remote from the body, said liquid discharge openings communicating with the chamber whereby when the arm moves downwardly the liquid within the chamber will be discharged therefrom in a row of spaced jets simulating the fingers of a hand, the discharge of said liquid allowing the arm to return to said normal position, and means to introduce liquid into the passage.

5. In a liquid actuated figure a body of flexible resilient material having a vertical passage extending therethrough and a laterally extending port extending therethrough and communicating with the passage, an arm carried by the body for movement in a vertically disposed arcuate path from a normal upwardly and outwardly extending position to a downwardly and outwardly extending position, said arm having a chamber therein which increases in size as it recedes from the body and which communicates at its smaller end with the port, said arm having a row of spaced liquid discharge openings at the end thereof remote from the body, and said liquid discharge openings communicating with the chamber whereby when the arm moves downwardly under the weight of the liquid therein the liquid in the chamber will be discharged therefrom in the form of jets simulating the fingers of a hand, and means to introduce liquid into the passage.

PHILIP L. GERTZ.

References Cited in the file of this patent
UNITED STATES PATENTS

| Number | Name | Date |
|---|---|---|
| 547,318 | Baily | Oct. 1, 1895 |
| 1,518,144 | Huggins | Dec. 9, 1924 |
| 1,918,874 | Shannahan | July 18, 1933 |